May 16, 1933.   S. E. BARTH ET AL   1,909,741
ALTERNATING WINDSHIELD
Filed April 27, 1932   4 Sheets-Sheet 1

May 16, 1933.　　S. E. BARTH ET AL　　1,909,741
ALTERNATING WINDSHIELD
Filed April 27, 1932　　4 Sheets-Sheet 2

INVENTORS
Sidney Edward Barth and
Harry Magidson
BY
Louis Prevost Whitaker
ATTORNEY Patented May 16, 1933

1,909,741

UNITED STATES PATENT OFFICE

SIDNEY EDWARD BARTH AND HARRY MAGIDSON, OF NEW YORK, N. Y., ASSIGNORS OF ONE-THIRD TO JOSEPH MAGIDSON, OF NEW YORK, N. Y.

ALTERNATING WINDSHIELD

Application filed April 27, 1932. Serial No. 607,680.

Our invention consists in the novel features hereinafter described, reference being had to the accompanying drawings, which show several embodiments of the invention selected by us for purposes of illustration, and the said invention is fully disclosed in the following description and claims.

In the operation of automotive vehicles during fog, rain, sleet and snow, it frequently happens that the glass windshields with which the vehicles are provided, become obscured, so that the operator is unable to see the road sufficiently well to safely operate the vehicle. Where a movable wiper is provided on the exterior of the windshield, it is frequently rendered ineffective, as in case of fog, for example, where the inner surface of the glass becomes coated with deposited moisture, and in case of rain, sleet or snow during the winter season, which frequently freezes on the exterior of the windshield.

The objection of our invention is to overcome these difficulties by providing the vehicle with an alternating windshield construction comprising two glazed windshield sashes, one of which is at all times in operative or exposed position, the other being normally enclosed in a trunk or receptacle extending within the vehicle, where it may be subjected to heat from the interior of the hood or engine compartment, or other heating source, and in combination therewith we provide sash alternating mechanism for raising the enclosed windshield sash contained in said trunk to operative position, while the exposed windshield sash remains in operative position, and thereafter depressing said previously exposed windshield sash into the trunk, where it may be subjected to heat to melt any ice or snow, and evaporate all moisture therefrom. In this manner whenever the weather conditions make it desirable to do so, the windshield sashes may be shifted or used in intermittent or continuous alternation, to the end that the driver's view of the road shall not become obscured.

It will be understood that in the alternating use of the two windshield sashes, the particular one which is enclosed within the trunk will always be fully raised to operative position before the other sash is depressed, so that the driver will at all times be fully protected, and not at any time subjected to wind, rain, sleet or snow, and the temperature within the vehicle will not therefore be affected by the frequent alternation of the windshields.

In the accompanying drawings we have shown one form of mechanism for securing the described alternate positioning of the windshield sashes which may be operated by the hand or by the foot of the operator, or by a connection with the engine of the vehicle or other source of power, but it is to be understood that we do not limit ourselves to the particular mechanical devices shown as the desired operation may be obtained in other ways.

Our invention also comprises certain novel features of construction and combination of parts hereinafter fully described and particularly pointed out in the claims.

Referring to the drawings,

Fig. 5 is a vertical sectional elevation on line 5—5 of Fig. 3.

Fig. 6 is a horizontal section on line 6—6 of Fig. 5.

Fig. 7 is a similar section showing the parts in the positions they occupy at the completion of the upward movement of the sash alternating mechanism.

Fig. 8 is a similar section showing the shifted position of the lock releasing slide on the downward movement of the sash alternating mechanism.

Fig. 15 is a detail sectional view adjacent to the upper end of the trunk showing the provision of windshield wipers.

In the embodiment of our invention herein shown the numeral 1 indicates the portion of the automobile body forming the frame for the windshield opening, and 2, represents a transversely disposed narrow trunk in alignment with the frame, 1, and extending below the hood, 3, of the automobile and behind the instrument panel, 4, thereof, a distance sufficient to contain and house one or other of the two alternating windshield sashes below the lower edge of the windshield opening. The frame, 1, is provided at each side with parallel guides for two windshield sashes. These guides are indicated in the drawings at 5, 6, 7, and said guides extend downwardly to near the bottom of the trunk, 2. 8 and 9 represent two windshield sashes each comprising a metallic enclosing frame, 8a, 9a, respectively, and a panel of glass, preferably of non-shatterable variety. It will be understood that one or the other of these sashes is at all times locked in place so as to close the windshield opening in the frame, 1, and is hereinafter referred to as the exposed sash, while the other sash is normally enclosed in the trunk, 2, and the sash occupying the trunk, whichever one it may be, will hereinafter be referred to as the enclosed sash, to distinguish it from the one which is in operative position, i. e., the exposed sash. Each of the sashes is capable of vertical movement independently of the other within its vertical guides from the exposed to the enclosed position, and vice versa.

Means are provided, as hereinafter described, for locking either of the sashes in the exposed position, and in connection with the sashes and said locking means therefor, we provide sash alternating means operable by or under the control of the driver or other occupant of the vehicle by means of which the enclosed sash within the trunk, 2, whichever it may be, is elevated fully into the exposed position and locked therein, to close the windshield opening while the previously exposed sash remains locked in the exposed position, and thereafter the previously exposed sash, released from its locking means, is positively lowered into the trunk so that at no time in the alternating or shifting of these sashes is the windshield opening permitted to be open at any part thereof, thus insuring that the driver shall be protected at all times from wind, rain, sleet, hale, snow, dust, etc., even during the shifting of the sashes.

Figure 2:
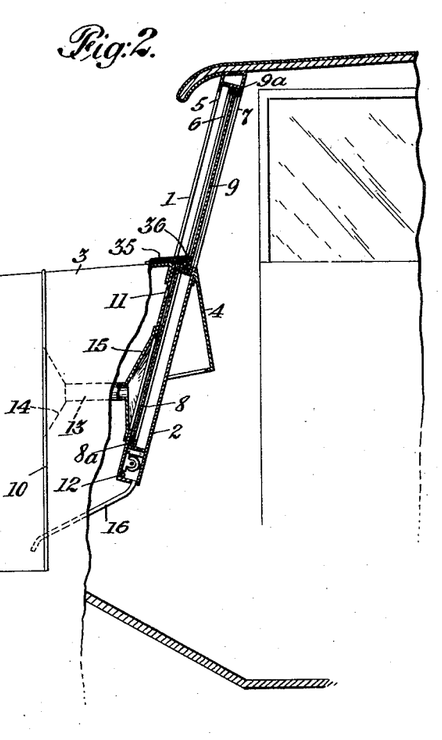
Fig. 2 represents a vertical sectional view of Fig. 1, on the line 2—2 thereof, looking in the direction of the arrow.

The trunk, 2, is in such a position immediately in rear of the back wall, 10, of the engine compartment, that it will of necessity receive a considerable amount of heat therefrom, which would tend to melt frost, sleet, ice, or snow, on the enclosed sash and evaporate any moisture thereon, while the sash remains within the trunk, and the upper portion of the rear wall of the trunk is preferably provided with suitable apertures, one of which is indicated at 11 in Fig. 2, to facilitate the escape of the evaporated water from the trunk in the form of vapor. In order to insure the rapid drying of the enclosed sash, the trunk, 2, may be provided with additional heating means of any suitable character. In this instance we have indicated two heating means, as examples, to wit, a heating coil, 12, located adjacent to the bottom of the trunk, 2, which may be employed if desired. Another arrangement which we prefer is also shown in Fig. 2, and consists of a horizontal passage, 13, of any desired width having a funnel shaped portion, 14, at its forward end, communicating directly with the engine compartment forward of the back wall or bulkhead, 10, and having at its rear end a similar funnel shaped portion, 15, communicating with the interior of the trunk, so as to conduct heated air from the engine compartment into the trunk to melt any frost, ice or snow, and evaporate any moisture on the enclosed windshield sash and cause it to pass out as vapor through the apertures, 11. The trunk is also provided at its lower end with one or more drain pipes, 16, one of which is illustrated in Fig. 2, for draining out water which may collect in the bottom of the trunk, and these drain pipes may be discharged within the engine compartment, where the small quantity of water will soon be evaporated and become dissipated or they may be carried to the outside of the body, as desired.

The particular form of sash locking mechanism and sash alternating mechanism illustrated herein will now be described, but it is to be understood that we do not limit ourselves to these particular forms of mechanism as variations therein may be made to suit the ideas of different constructors. In this instance the frames, 9a and 8a, of the sashes, which are preferably formed of metal and which enclose the marginal portions of the glass windshield panels, are provided adjacent to their lower edges, and on opposite sides, with laterally projecting flanges, indicated at 8b and 9b respectively. Each of these flanges is provided with an aperture, said apertures being indicated at 8c and 9c, respectively, to engage movable locking means, and also movable sash engaging means forming part of the sash alternating mechanism. In the present instance the lateral members of the windshield frame, 1, are shown hollow, that is to say, formed conveniently of sheet metal providing a space, 17, into which the projecting flanges, 8b and 9b, extend through vertical slots in the vertical sash guides, and within this space at each side of the windshield are provided pivoted locking latches, 18 and 19, for respectively engaging the apertures, 8c and 9c, of the sashes when in the exposed position, and locking them therein. Each of the latches, 18 and 19, is provided with a releasing arm, said arms being indicated at 18a and 19a, respectively, provided with depending portions, 18b and 19b respectively, out of alignment with each other and adapted to be engaged by one or other of two projections, 20, on a block, 21, mounted to slide transversely of the vehicle between suitable guides, 22, on a second sliding block, 23, movable longitudinally of the vehicle, and carried by a vertically movable nut, 24, which is at all times in engagement with a double threaded screw of well known construction, indicated at 25. The slides, 21 and 23, have their central portions cut away as shown, to accommodate the screw shaft. By this means the nut and the parts carried thereby will be caused to travel from one end of the threaded portion of the screw, to the other, reversing its direction of travel at each end of said threaded portion, in the well known way. For convenience of reference, the slide, 21, will be termed the lock releasing slide and the slide or block, 23, will be termed the sash engaging slide.

The sash engaging slide, 23, is provided on opposite sides with sash engaging projections, 28 and 29, to engage respectively, the apertures, 8c and 9c, in the sash extensions, 8b and 9b. Adjacent to the depending portion, 18b, of each of the locking releasing arms, which are located on opposite sides of the slides, we provide a stationary cam, 38 and 39, respectively, provided with a beveled portion for engaging the adjacent projection, 20, on the lock releasing slide. As indicated clearly in Fig. 6, the lock releasing slide can be moved to project either of the projections, 20, between the cam, 38 and arm, 18b, or between the cam, 39, and the arm, 19b. It will also be seen in this figure that the sash engaging slide, 23, can be moved in a direction perpendicularly to the line of movement of slide, 21, to bring one of its projections, as 28, into engagement with the adjacent sash, while the opposite projection, 29, is out of engagement with the adjacent sash, and vice versa.

Figure 1:
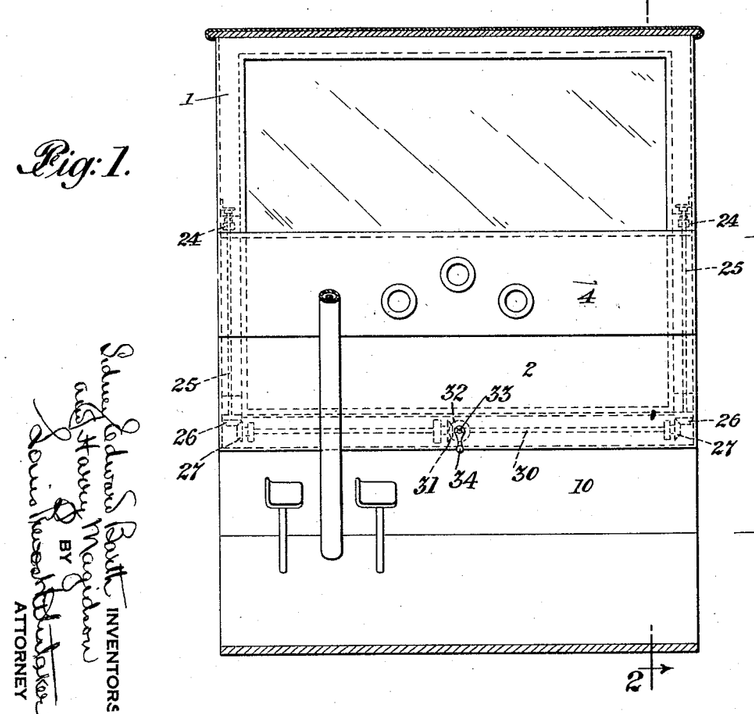
Fig. 1 represents a transverse sectional view of an automobile showing our improved alternating windshield embodied therein as it would appear from the driver's seat, the steering wheel being broken away and parts being indicated in dotted lines.

It will be understood that the parts thus far described are duplicated at opposite ends of the sashes, and means are provided for simultaneously operating the double screws, 25. In the arrangement shown in Figs. 1 and 2, for example, each of the screw shafts, 25, is provided at its lower end with a beveled gear, 26, engaging a beveled gear, 27, on a shaft, 30, extending transversely through the lower portion of the trunk, which shaft may be operated in any suitable manner. As shown in Fig. 1, for example, the shaft, 30, is provided near its central portion, with a beveled gear, 31, engaging a beveled gear, 32, on a driving shaft, 33, extending through the front of the trunk and provided with a hand crank, 34, of which both screw shafts can be rotated so as to simultaneously raise or lower the nuts, 24, and the slides carried thereby.

Figure 3:
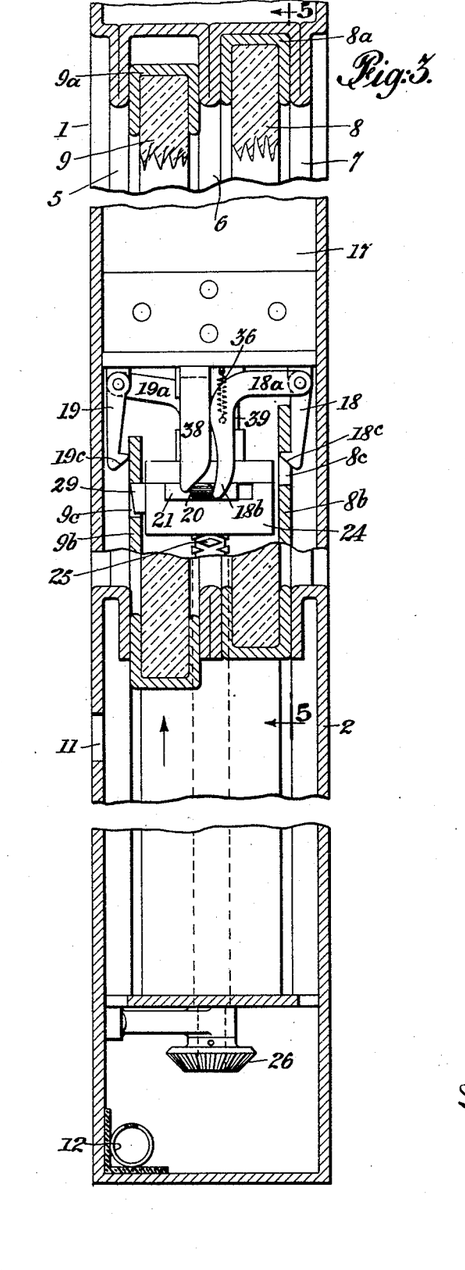
Fig. 3 is an enlarged vertical sectional view of the alternating windshield sashes, the enclosing trunk therefor, and the sash alternating mechanism, showing the parts in the position they would occupy when an enclosed sash, in this instance the forward sash, has almost reached its locking position, and before the release of the previously exposed sash.
Figure 4:
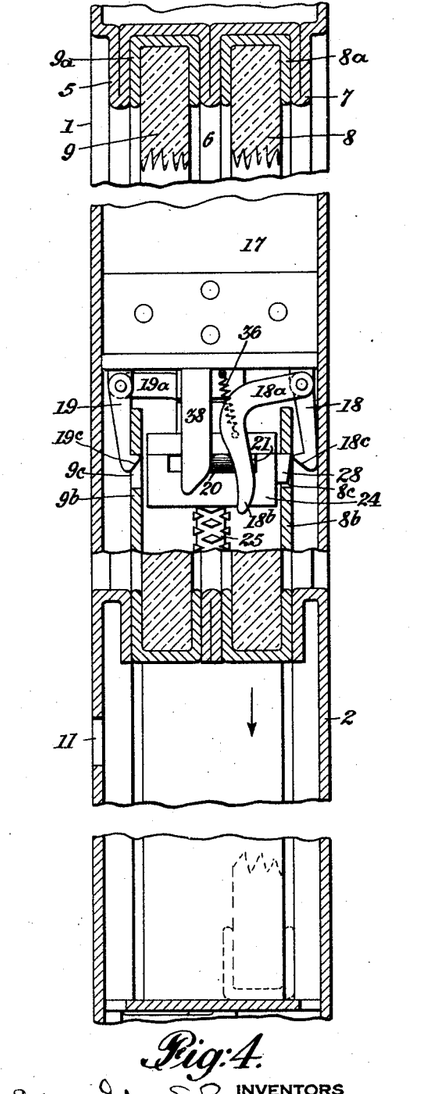
Fig. 4 is a similar view showing the forward sash locked and the previously exposed sash released and transferred to the control of the sash alternating mechanism.

The operation of the alternating windshield is as follows. It will be assumed that the sash, 9, is in the exposed or operative position, and the sash, 8, is in the enclosed position within the trunk, as indicated in Fig. 2. We prefer to provide a pivoted flap, 35, as indicated in Fig. 1, provided with a rubber outer edge, as indicated at 36, to engage the exposed sash, whichever one is in the exposed position, and to act as a wiper on the outer face of the outer sash during the lowering of the same. This flap will also swing over the upper portion of the outer sash, 8, when the latter is in the lowered position, as shown. Assuming that the exposed windshield sash has become obscured by rain, snow, sleet, or that for any other reason, it is desired to shift the windshield sashes, this can be readily done by simply rotating the handle, 33, to simultaneously operate the screw shafts, 25, and raise the nuts, 24, engaging the same. At the commencement of the operation, the locking devices, 18, will be in engagement with the exposed sash, in this instance the sash, 8, and the sash engaging projections, 29, will be in engagement with the apertures, 9c, in the opposite projections, 9b, of the sash, 9, so that the nuts, 24, travel up the screw shafts, the enclosed sash, 9, will be raised smoothly in its guides, the exposed sash, 8, remaining in its exposed and locked position during the upward movement of the other sash. In Fig. 3 we have shown the position of the parts as the sash being elevated, in this instance, sash 9, nears its operative or exposed position in front of the sash, 8. At this point the projections, 20, at the end of the lock releasing slide, 21, adjacent the cam, 38, has reached a position to operatively engage the depending portion, 18b, of the lock releasing lever, and also to engage said cam, 38. As the upward movement of the nut, 24, and sash, 9, continues, cam, 38, forces the lock releasing slide toward the releasing arm, moving bodily the sash engaging slide, and gradually disengaging the locking device, 18, from the aperture, 8c, and simultaneously withdrawing the sash engaging projection, 29, from the aperture, 9c, and simultaneously causing the opposite sash engaging projection, 28, to enter the aperture, 8c. As the upward movement of sash, 9, is completed, the parts assume the positions illustrated in Fig. 4, in which it will be seen that the locking device, 18, has been entirely disconnected from the aperture, 8c, which is now engaged by the sash engaging projection, 28, while on the other side of the nut the sash engaging projection, 29, has been entirely withdrawn from the aperture, 9c, which is now engaged by the locking device, 19. At this point the thread engaging portion of the nut, 24, reaches the end of the double thread and reverses its travel, so as to cause the nut to move downwardly carrying with it the previously exposed sash, which is in this instance the windshield sash, 8, which is then lowered into the trunk, 2, leaving the sash, 9, in the exposed position, closing the windshield opening. The locking devices, 18, are provided with suitable weights or springs, by which they are yieldingly held in position to engage the locking apertures in the plate extensions of the respective sashes. In this instance we have shown each locking device provided with a light spring, 36, which hold the locking devices normally in operative position in which they are arrested by the engagement of the arms, 18a and 19a, with their respective cams, 38 and 39, and the lower ends of each of the locking devices is provided with a beveled portion, indicated at 18c, 19c, to be engaged by the upper edge of the frame extension, 8b or 9b, of the adjacent sash to insure the proper operation of the locking devices.

As a result of the sash alternating operation just described, a fresh windshield sash in a dry and warm condition is withdrawn from the trunk, elevated to the exposed position to close the windshield opening, while the previously exposed windshield sash remains in operative position, after which the previously exposed sash is lowered into the trunk, where the ice, if any thereon, will be melted, and the moisture evaporated, and the sash quickly dried and warmed, when the operation may be repeated. In this manner the driver is assured of clear vision through the exposed windshield, and is protected at all times from the weather. Under ordinary conditions, a considerable interval may elapse between the alternations of the windshield sashes sufficient to thoroughly remove the moisture, ice, sleet or snow from the enclosed sash and dry and warm the same before it is again elevated to the exposed position.

After each operation of the sash alternating mechanism, it is necessary to shift the lock releasing slide, so as to withdraw the projection, 20, at one end thereof, and place the projection, 20, at the opposite end, in operative relation with the fixed cam and lock releasing arm on the other side of the nut in order that the shifting of the sash engaging slide at the end of the next upward movement of the nut shall be in the opposite direction. The alternate shifting of the alleged releasing slide is conveniently accomplished on the downward movement of the nuts by means of oppositely disposed pawls, 40 and 41, preferably pivoted to the sides of the vertical passages through which the nuts move, and preferably pivotally mounted as shown in Fig. 5, so that they can yield if accidently struck by one of the projections, 20, during the upward movements of the nuts. These pawls are slightly out of alignment with each other, each one being in position to engage a beveled portion, 20, of the projection, 20, which has just previously made contact with one of the stationary cams, and the adjacent lock releasing arm, and thereby push it inwardly, shifting the slide, 21, and pushing out the projection, 20, at the opposite end of the slide, into operative relation with the fixed cam, which it will engage at the end of the next upward travel of the nuts.

If it is desired, the glass panels of each windshield sash may be subjected to the action of a windshield wiper during its downward movement into the trunk, or during its upward movement into exposed position, or both. In Fig. 15, for example, we have illustrated an arrangement of stationary windshield wipers for engaging the forward face of the glass panel of each sash, and wiping the same during both the downward and upward movements of the sashes. As shown in this figure, the forward edge of the trunk, 2, is provided with a spring plate, 80, extending transversely of the trunk for a distance equal to the width of the glass panel and provided with downwardly and upwardly extending yielding portions, 81 and 82, terminating in forwardly extending flanges, 83 and 84, to engage rubber wiping strips, 85 and 86, clamped between said flanges, and exterior clamping plates, indicated at 87 and 88, for example, by rivets, 89, extending through the opposed clamping plates, and the enclosed rubber strip or wiper which projects rearwardly to engage the glass panel of the sash, 8. At each end of the clamping plate, 87, we provide upwardly projecting curved or inclined frame engaging portions, 90, to engage the lower frame member and push the wiper out of the way to avoid injury thereto, when the sashes are shifted, and the clamping plate, 88, is likewise provided with similar downwardly extending sash engaging portions, 91, for the same purpose.

Between the sashes, 8 and 9, we provide a transverse plate, 92, carrying an exactly similar wiper construction with that previously described, the parts being indicated by the same reference numerals, with the addition of the letter $a$. With this construction it will be seen that the glass panel of each sash will be wiped by the rubber wipers, 85 and 86, or 85$a$ and 86$a$, both on the downward movement into the trunk, and also on the upward movement, to exposed position. In some cases it may be found that a single rubber wiper blade for each sash is sufficient, in which case either the upwardly extending or downwardly extending spring arms, 81, 81$a$ or 82, 82$a$, may be dispensed with.

Figure 9:
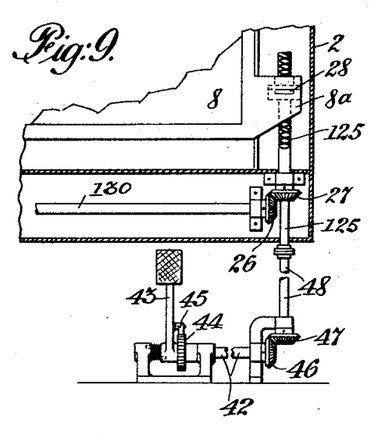
Fig. 9 is a detail view illustrating a foot actuated means for operating the sash alternating mechanism.
Figure 10:
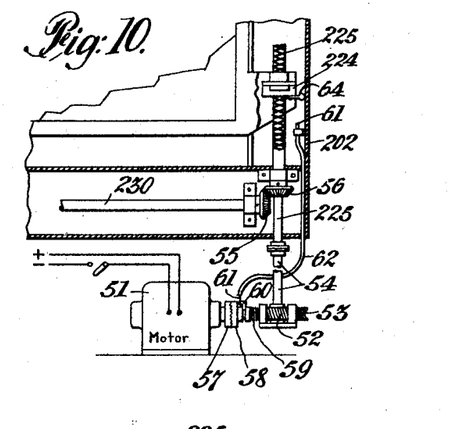
Fig. 10 is a detail view showing an arrangement in which the sash alternating mechanism is operated by a motor under the control of clutch, and means for manually starting and automatically stopping the sash alternating mechanism.
Figure 11:
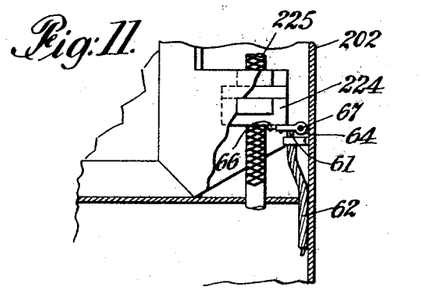
Fig. 11 is a detail elevation of a portion of the automatic clutch operating mechanism.
Figure 12:
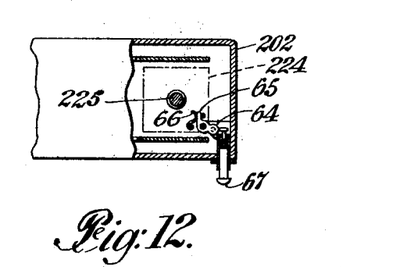
Fig. 12 is a plan view of the parts shown in Fig. 11.
Figure 13:
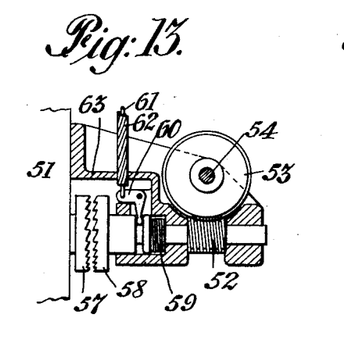
Fig. 13 is a detail sectional view of the clutch mechanism and connected parts.

The sash alternating mechanism can be operated by hand, as previously described, or it may be operated by the foot of the operator, or by power. In Fig. 9 we have illustrated, in connection with the horizontal shaft, 30, for operating both of the double screws in the manner previously described, a foot operated shaft, 42, provided with a spring actuated pedal, 43, loosely mounted on the shaft, 42, and connected therewith by means of a ratchet wheel, 44, on the shaft, and a pawl, 45, on the pedal, the said shaft, 42, being connected by suitable gears, 46, 47, with a vertically disposed shaft, 48, which may be located at one side of the vehicle, preferably in alignment with and connected with one of the screw shafts, here indicated at 125, and connected at its upper end by gears, 27 and 26, with the horizontal driving shaft, here indicated at 130, so that the sash alternating mechanism may be operated in the manner previously described by means of this pedal, 43, without the necessity of the operator taking his hand from the wheel.

In some instances it is desirable to have the sash alternating mechanism operated by power, which may be either a separate small electric motor, or a connection with some continuously rotating part driven by the engine or vehicle, as for example, the engine crank shaft, or a continuously operated shaft of the transmission mechanism. In either case we prefer to provide a clutch between the motive power and the driving shaft for the sash alternating mechanism, and an automatic throw-out which will disconnect the clutch members when the nut has been raised to its highest position, and returned to its lowest position by the double screws, or in other words has effected a single alternation of the windshield sashes. In Figs. 10 to 13 inclusive, for example, we have illustrated an electric motor, 51, the shaft of which is connected by worm, 52, and worm wheel, 53, with a vertical shaft, 54, in alignment with and connected with one of the screw shafts, here indicated at 225, and connected by gears, 55 and 56, with the horizontal transverse shaft, here indicated at 230, for effecting the simultaneous driving of the screw shafts. A clutch mechanism comprising a member, 57, on the motor shaft, and a longitudinally movable member, 58, on the worm shaft, is interposed between the motor and worm, the movable member being provided with a spring, 59, tending to move the clutch member, 58, into engagement with the clutch member, 57, and the clutch member, 58, is thrown out of operation by means of a bell crank lever, 60, one arm of which engages a groove in a sleeve connected with the clutch member, 58, the other arm being connected to a Bowden wire, 61, in the usual casing, 62, said casing being connected to the clutch housing, indicated at 63, and to a portion of the trunk, indicated at 202, where the upper end of the Bowden wire projects slightly from the casing on one side of the position occupied by one of the nuts, here indicated at 224, when in its lowest position. The said nut is provided with a pivoted bell crank, 64, having an arm, 65, normally held by a spring, 66, in position to engage the exposed end of the Bowden wire, 61, and depress it, thereby throwing out the clutch automatically, when the nut, 224, reaches its lowest position on its screw shaft, here indicated at 225. A push button, 67, extending through the front wall of the trunk, 202, is arranged in position to strike the bell crank lever, 64, when pushed in and disengage the arm, 65, from the Bowden wire, 61. In the use of this construction the motor is started in any usual or ordinary manner, by closing a contact connecting it with the storage battery of the vehicle, and when the push button, 67, is pressed in, the clutch members, 58 and 57, will be brought into operative relation by the spring, 59, thus causing the nuts, 224, to be elevated, carrying whichever windshield sash is enclosed in the trunk to the exposed or operative position, and lowering the previously exposed windshield sash in the manner previously described, and as the nuts arrive at their lowest positions, the arm, 65, of the bell crank lever, 64, will engage the Bowden wire, 61, and throw out the clutch. The motor can then be stopped by means of its control mechanism, or in case of extremely inclement weather, when the windshields must be alternated at intervals over a considerable period of driving, the motor may be permitted to run as long as needed, and whenever the operator presses the button, 67, the alternation of the windshields will be effected.

Figure 14:
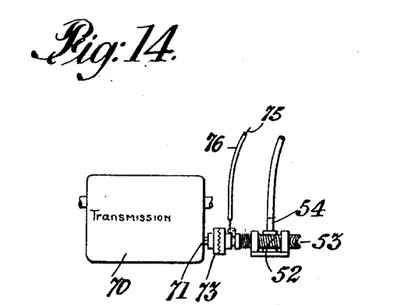
Fig. 14 is a detail view illustrating the manner in which the power for operating sash alternating mechanism may be obtained from the engine through a continuously rotating part of the transmission.

In some instances it may be convenient or desirable to operate the shaft, 54, from a moving part of the transmission, using the power of the engine, and in Fig. 14, we have shown more or less diagrammatically, the transmission mechanism of the engine at 70, the neutral or continuously operating shaft, 71, of which is adapted to be connected by a flexible shaft with the lower end of the shaft, 54, illustrated in Figs. 10 to 13, for example (or to one of the connected double screw shafts) through the instrumentality of clutch members, indicated at 73, constructed and operating as previously described with reference to the clutch members, 57 and 58, and operated in the same manner through the connecting Bowden wire, indicated at 75, and casing, 76, therefor. It will be understood that the operation will be the same as above described, except that the source of power which is thus intermittently called into action by the pressing of the push button, 67, will be furnished from the motor.

What I claim and desire to secure by Letters Patent is:—

1. In an alternating windshield, the combination with a frame providing a windshield opening, and an enclosing trunk below said opening, of two independently movable windshield sashes, each movable from an enclosed position within said trunk to an exposed position closing said opening, one or other of said sashes being maintained at all times in said exposed position, and the other being normally maintained enclosed within said trunk, and sash alternating mechanism for elevating the enclosed sash into operative exposed position to close said opening, and lowering the previously exposed sash to enclosed position within said trunk after the elevated sash completely closes said opening.

2. In an alternating windshield, the combination with a frame providing a windshield opening, and an enclosing trunk below said opening, of two independently movable windshield sashes, each movable from an enclosed position within said trunk to an exposed position closing said opening, one or other of said sashes being maintained at all times in said exposed position, and the other being normally maintained enclosed within said trunk, means for locking each sash in said exposed position, and sash alternating mechanism for elevating the enclosed sash into engagement with its said locking means, and releasing the locking means for the previously exposed sash and thereafter lowering the previously exposed sash to enclosed position within said trunk.

3. In an alternating windshield, the combination with a frame providing a windshield opening, and an enclosing trunk below said opening of two independently movable windshield sashes, each movable from an enclosed position within said trunk to an exposed position closing said opening, one or other of said sashes being maintained at all times in said exposed position, and the other being normally maintained enclosed within said trunk, sash alternating mechanism including vertical reciprocatable elevating and lowering means provided with laterally movable engaging means for connecting it with one or other of said sashes, and shifting means for shifting said engaging means from one sash to another when both sashes are in said exposed position.

4. In an alternating windshield, the combination with a frame providing a windshield opening, and an enclosing trunk below said opening, of two independently movable windshield sashes, each movable from an enclosed position within said trunk to an exposed position closing said opening, one or other of said sashes being maintained at all times in said exposed position, and the other being normally maintained enclosed within said trunk, sash alternating mechanism including vertical reciprocatable elevating and lowering means provided with laterally movable engaging means for connecting it with one or other of said sashes, means for locking each sash in said exposed position, and shifting means for shifting said engaging means from a sash when it reaches said exposed position, into engagement with the previously exposed sash and simultaneously releasing the locking means therefor to permit said latter sash to be lowered into said trunk.

5. In an alternating windshield, the combination with a frame providing a windshield opening, and an enclosing trunk below said opening, of two independently movable windshield sashes, each movable from an enclosed position within said trunk to an exposed position closing said opening, one or other of said sashes being maintained at all times in said exposed position, and the other being normally maintained enclosed within said trunk, sash alternating mechanism including vertical reciprocatable elevating and lowering means provided with laterally movable engaging means for connecting it with one or other of said sashes, a movable locking device for engaging said sash when in said exposed position, and a lock actuating means therefor, stationary cams for actuating said engaging means and locking means, when a sash is elevated to said exposed position to transfer said engaging means to the engagement with the previously exposed sash and simultaneously release the locking means therefor to permit it to be lowered into said trunk.

6. In an alternating windshield, the combination with a frame providing a windshield opening, and an enclosing trunk below said opening, of two independently movable windshield sashes, each movable from an enclosed position within said trunk to an exposed position closing said opening, one or other of said sashes being maintained at all times in said exposed position, and the other being normally maintained enclosed within said trunk, sash alternating mechanism including vertical reciprocatable elevating and lowering means provided with laterally movable engaging means for connecting it with one or other of said sashes, a movable locking device for engaging said sash when in said exposed position, and a lock actuating means therefor, stationary cams for actuating said engaging means and locking means, when a sash is elevated to said exposed position to transfer said engaging means to the engagement with the previously exposed sash and simultaneously release the locking means therefor to permit it to be lowered into said trunk, a part movable transversely with respect to the direction of movement of said engaging means and having portions for engaging both of said cams, and stationarily supported shifting devices for shifting said part from operative relation with one of said cams into operative relation with the other.

7. In an alternating windshield, the combination with a frame providing a windshield opening, and an enclosing trunk below said opening, of two independently movable windshield sashes, each movable from an enclosed position within said trunk to an exposed position closing said opening, one or other of said sashes being maintained at all times in said exposed position, and the other being normally maintained enclosed within said trunk, means for locking each sash in said exposed position, and sash alternating mechanism for elevating the enclosed sash into engagement with its said locking means, and releasing the locking means for the previously exposed sash and thereafter lowering the previously exposed sash to enclosed position within said trunk, and power means for actuating said sash alternating mechanism.

8. In an alternating windshield, the combination with a frame providing a windshield opening, and an enclosing trunk below said opening, of two independently movable windshield sashes, each movable from an enclosed position within said trunk to an exposed position closing said opening, one or other of said sashes being maintained at all times in said exposed position, and the other being normally maintained enclosed within said trunk, screw shafts at opposite ends of said sashes, nuts engaging said screw shafts and movable upwardly and downwardly thereon, movable locking means for locking each of said sashes when in said exposed position, movable sash engaging means and lock releasing means carried by said nuts, stationary cams for shifting said sash engaging and lock releasing means, when said nuts are substantiallly at the end of their upward movement, and means for simultaneously operating said screw shafts.

9. In an alternating windshield, the combination with a frame providing a windshield opening, and an enclosing trunk below said opening, of two independently movable windshield sashes, each movable from an enclosed position within said trunk to an exposed position closing said opening, one or other of said sashes being maintained at all times in said exposed position, and the other being normally maintained enclosed within said trunk, double threaded screw shafts at opposite ends of said sashes, nuts engaging said screw shafts, movable locking means for holding each of said sashes in exposed position, horizontally movable sash engaging means carried by said nut and movable into engagement with one or other of said sashes, lock releasing means carried by said nut and movable with and with respect to said sash engaging means, stationary cams for shifting said sash engaging and lock releasing means, when said nuts are substantially at the end of their upward travel, means for shifting the position of said lock releasing means with respect to said sash engaging means, and means for simultaneously driving said screw shafts.

10. In an alternating windshield, the combination with a frame providing a windshield opening, and an enclosing trunk below said opening, of two independently movable windshield sashes, each movable from an enclosed position within said trunk to an exposed position closing said opening, one or other of said sashes being maintained at all times in said exposed position, and the other being normally maintained enclosed within said trunk, screw shafts at opposite ends of said sashes, nuts engaging said screw shafts and movable upwardly and downwardly thereon, movable locking mean for locking each of said sashes when in said exposed position, movable sash engaging means and lock releasing means carried by said nuts, stationary cams for shifting said sash engaging means and lock releasing means, when said nuts are substantially at the end of their upward movement, and power means for simultaneously operating said screw shafts.

11. In an alternating windshield, the combination with a frame providing a windshield opening, and an enclosing trunk below said opening, of two independently movable windshield sashes, each movable from an enclosed position within said trunk to an exposed position closing said opening, one or other of said sashes being maintained at all times in said exposed position, and the other being normally maintained enclosed within said trunk, double threaded screw shafts at opposite ends of said sashes, nuts engaging said shafts, a horizontally movable slide carried by said nut, and provided with oppositely disposed sash engaging portions, a lock releasing slide carried by said sash engaging slide, and movable with the same, movable with respect thereto transversely of the direction of movement of said sash engaging slide and provided with oppositely disposed lock releasing projections, oppositely disposed fixed cams adjacent to the upper end of the travel of said nuts, each located in position to engage one of said lock releasing projections, to move both of said slides simultaneously to effect the release of one sash and the shifting of the sash engaging slide into engagement therewith and permit the locking of the other sash, and stationary devices for engaging said lock releasing slide and shifting it with respect to the sash engaging slide and stationary cams, and means for simultaneously operating said screw shafts.

In testimony whereof we affix our signatures.

SIDNEY EDWARD BARTH.
HARRY MAGIDSON.